United States Patent
Kwak et al.

(10) Patent No.: US 8,145,009 B2
(45) Date of Patent: Mar. 27, 2012

(54) APPARATUS FOR REMOVING RINGING NOISE AND APPARATUS FOR REMOVING NOISE

(75) Inventors: Boo Dong Kwak, Gyunggi-do (KR); Bong Soon Kang, Busan (KR); Won Woo Jang, Busan (KR); Hak Sun Kim, Daejeon (KR); Joo Hyun Kim, Gyunggi-Do (KR); Won Tae Choi, Gyunggi-Do (KR)

(73) Assignee: Samsung Electro-Mechanics Co., Ltd., Gyunggi-do (KR)

( * ) Notice: Subject to any disclaimer, the term of this patent is extended or adjusted under 35 U.S.C. 154(b) by 960 days.

(21) Appl. No.: 12/121,057

(22) Filed: May 15, 2008

(65) Prior Publication Data

US 2008/0285877 A1    Nov. 20, 2008

(30) Foreign Application Priority Data

May 18, 2007  (KR) .................. 10-2007-0048666

(51) Int. Cl.
*G06K 9/40*  (2006.01)

(52) U.S. Cl. ....................................................... 382/275
(58) Field of Classification Search ........... 382/254–275
See application file for complete search history.

(56) References Cited

U.S. PATENT DOCUMENTS

| | | | |
|---|---|---|---|
| 6,501,863 B1 * | 12/2002 | Fukuhara et al. | 382/251 |
| 6,539,060 B1 * | 3/2003 | Lee et al. | 375/240.29 |
| 7,680,355 B2 * | 3/2010 | Chiu et al. | 382/266 |
| 2003/0219073 A1 * | 11/2003 | Lee et al. | 375/240.27 |
| 2007/0076972 A1 * | 4/2007 | Chiu | 382/261 |
| 2008/0152017 A1 * | 6/2008 | Vendrig et al. | 375/240.27 |

* cited by examiner

*Primary Examiner* — Jingge Wu
(74) *Attorney, Agent, or Firm* — Lowe, Hauptman, Ham & Berner, LLP

(57) ABSTRACT

Provided are an apparatus for removing ringing noise and an apparatus for removing noise. The apparatuses includes a representative value setting block dividing pixel data in one block including a plurality of pixel data into two groups through a K-means algorithm and setting a representative value in each of the groups; a parameter generator block calculating intervals and approaches between all the pixel data in the block and a pair of the representative values; and a correction block correcting an inputted pixel data value using the intervals and the approaches.

19 Claims, 6 Drawing Sheets

APPARATUS FOR REMOVING RINGING NOISE AND APPARATUS FOR REMOVING NOISE

CROSS-REFERENCE TO RELATED APPLICATIONS

This application claims the priority of Korean Patent Application No. 2007-48666 filed on May 18, 2007, in the Korean Intellectual Property Office, the disclosure of which is incorporated herein by reference.

BACKGROUND OF THE INVENTION

1. Field of the Invention

The present invention relates to an apparatus for removing noise, and more particularly, to an apparatus for removing noise capable of removing blocking discontinuity noises and ringing noises.

2. Description of the Related Art

The recent development in digital video technology has resulted in the improvement of electric home appliances such as a digital camera, a mobile camera, a DVD player and a digital broadcasting system. However, blocking discontinuity noises and ringing noises are caused in these systems due to the emphasis of color contrast in images, the increase in the entire luminance of images, or the post-treatments such as enlargement and reduction of an image in size, and filtering processes.

For these blocking discontinuity noises, a grid noise occurs in relatively similar areas between the pixels, and a staircase effect appears in the form of staircase along interfaces of images.

The ringing noise occurs from the truncation due to the quantization of data, and therefore pictures appear as if they are overlapped in many folds due to this ringing noise.

In general, a lowpass filter is used in the conventional methods for removing a blocking discontinuity noise and a ringing noise. However, the conventional methods have a problem that blurring noises are caused since high-frequency components are degraded in the entire images. As an alternative for removing a ringing noise, there is a method for removing a ringing noise comprising: detecting an area having a ringing noise according to the results of local statistics, adaptively (optionally) selecting an exclusive low pass filter and employing the exclusive low pass filter. However, the method has a problem that all values in a corresponding area are processed since the characteristics of algorithm require the statistics. Therefore, the method requires large amounts of time since an arithmetic operation is complicated and repeatedly performed, and pixels in the entire image should be processed one by one. In addition, since the exclusive low pass filters are manufactured previously, stored and extracted for use (ROM mode), it is difficult to precisely control active changes and values with increasing precision.

SUMMARY OF THE INVENTION

The present invention is designed to solve the problems of the prior art, and therefore it is an object of the present invention to provide an apparatus for actively removing blocking discontinuity noise and ringing noise that are generated based on a block operation.

According to an aspect of the present invention, there is provided an apparatus for removing ringing noise, the apparatus including a representative value setting block dividing pixel data in one block including a plurality of pixel data into two groups through a K-means algorithm and setting a representative value in each of the groups; a parameter generator block calculating intervals and approaches between all the pixel data in the block and a pair of the representative values; and a correction block correcting an inputted pixel data value using the intervals and the approaches, wherein the intervals are distances between inputted pixel data and the representative value of the group to which the inputted pixel data belong, wherein the approaches are ratios of distances between inputted pixel data and the representative value of the group to which the inputted pixel data belong to distances between the inputted pixel data and the representative value of the group to which the inputted pixel data do not belong, and wherein the correction block performs a mathematical operation as represented by the following equations:

$$R_{i\_mod} = R_i + k \times [(1-\text{Approach})/(\text{Acc}_{interval})] \times (R_{rep\_i} - R_i)$$

$$G_{i\_mod} = G_i + k \times [(1-\text{Approach})/(\text{Acc}_{interval})] \times (G_{rep\_i} - G_i)$$

$$B_{i\_mod} = B_i + k \times [(1-\text{Approach})/(\text{Acc}_{interval})] \times (B_{rep\_i} - B_i)$$

wherein, $R_i$, $G_i$ and $B_i$ are inputted pixel data, $R_{rep\_i}$, $G_{rep\_i}$ and $B_{rep\_i}$ are third representative values, such as the inputted pixel data, belonging to the group, $\text{Acc}_{interval}$ is a value obtained by accumulating intervals by block, and $R_{i\_mod}$, $G_{i\_mod}$ and $B_{i\_mod}$ are corrected inputted pixel data values.

In this case, an equation used to calculate the intervals may be:

$$\text{Interval} = |R_i - R_{rep\_i}| + |G_i - G_{rep\_i}| + |B_i - B_{rep\_i}|,$$

wherein, $R_i$, $G_i$ and $B_i$ are inputted pixel data, and $R_{rep\_i}$, $G_{rep\_i}$ and $B_{rep\_i}$ are representative values, such as the inputted pixel data, belonging to the group.

Also, an equation used to calculate the approaches may be:

$$\text{Approach} = [(R_i - R_{rep\_a})^2 + (G_i - G_{rep\_a})^2 + (B_i - B_{rep\_a})^2] / [(R_i - R_{rep\_b})^2 + (G_i - G_{rep\_b})^2 + (B_i - B_{rep\_b})^2],$$

wherein, $R_i$, $G_i$ and $B_i$ are inputted pixel data, $R_{rep\_a}$, $G_{rep\_a}$ and $B_{rep\_a}$ representative values, such as the inputted pixel data, belonging to the group, and $R_{rep\_b}$, $G_{rep\_b}$ and $B_{rep\_b}$ are representative values belonging to the other group that is different from the group to which the inputted pixel data belong.

In addition, the representative value setting block may include a first representative value setting block selecting, as first representative values, a pixel data having the maximum contrast and pixel data having the minimum contrast among the pixels in the block; a second representative value setting block dividing pixels in the block into two groups through a K-means algorithm by employing the first representative value as a reference value and extracting pixel data mean values in the respective groups as a pair of second representative values; and a third representative value setting block extracting a pair of the third representative values using a vector inner product between the second representative value and the pixel data in the block and an area determination method for selecting pixel data in a predetermined area.

In this case, the second representative value setting block may measure distances between each of a pair of the first representative values and the pixel data in the block, classify the pixel data closer to one representative value of a pair of the first representative values into a first group, and the pixel data closer to the other representative value of a pair of the first representative values into a second group, accumulate the pixel data belonging respectively to the two groups, and average the accumulated pixel data values in each of the two groups.

Also, the third representative value setting block may set a pair of the second representative values to fixed areas so that a pair of the second representative values are not overlapped with each other, calculates dot products of a vector from one representative value to the other representative value among a pair of the second representative values, and a vector from the one representative value to an inputted pixel data of an area except for the fixed area, accumulate a pixel data of an area that is set on the basis of one representative value out of a pair of the second representative values and a pixel data value of an area in which the dot product in the one representative value is less than 0, and average the accumulated pixel data values in each of the two groups.

Furthermore, the fixed areas may be formed in a round shape on the basis of the second representative value, and may have a radius that is ¼ of a distance between a pair of the second representative values.

According to another aspect of the present invention, there is provided an apparatus for removing noise including an input image blocking block blocking a plurality of pixel data into fixed unit areas; a ringing noise removing block removing ringing noise based on information on the pixel data in each of the blocks; and a recovery block recovering the blocked data into a normal image.

In this case, the blocking block may block some areas of adjacent blocks so that the some areas can be overlapped with each other, and the recovery block may recover the blocked pixel data into an output image by applying different weights to the blocked pixel data according to the position of pixels in the block.

Also, the adjacent blocks may be arranged so that half block areas of the adjacent blocks can be overlapped with each other.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Exemplary embodiments of the present invention will now be described in detail with reference to the accompanying drawings.

Figure 1:
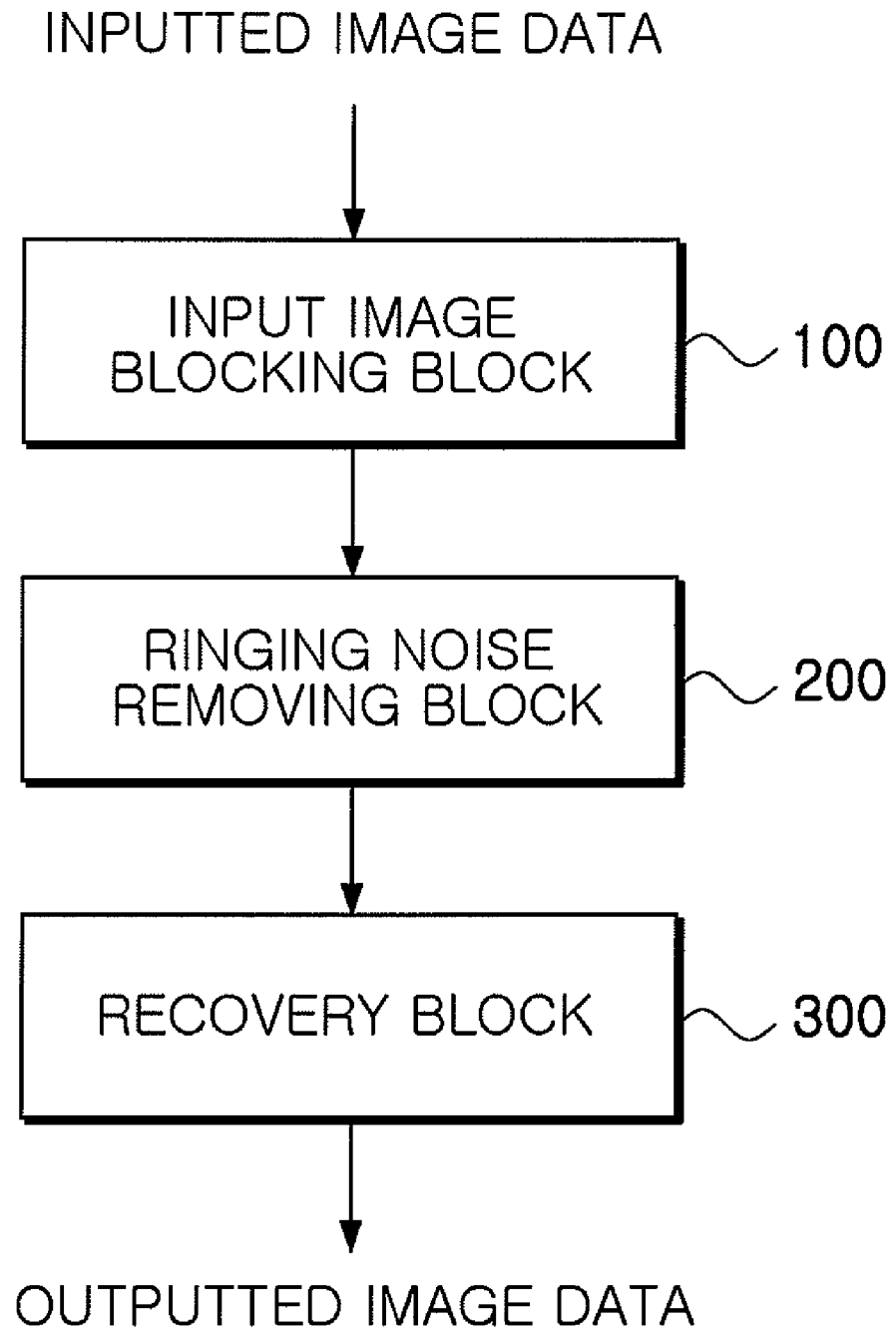
FIG. 1 is a block view illustrating an apparatus for removing noise according to one exemplary embodiment of the present invention.

FIG. 1 is a block view illustrating an apparatus for removing noise according to one exemplary embodiment of the present invention.

Referring to FIG. 1, a system according to one exemplary embodiment of the present invention includes an input image blocking block 100, a ringing noise removing block 200 and a recovery block 300.

The ringing noise removing block 200 will be described later in detail in FIG. 4.

The input image blocking block 100 divides input images into blocks having a predetermined number.

Figure 2:
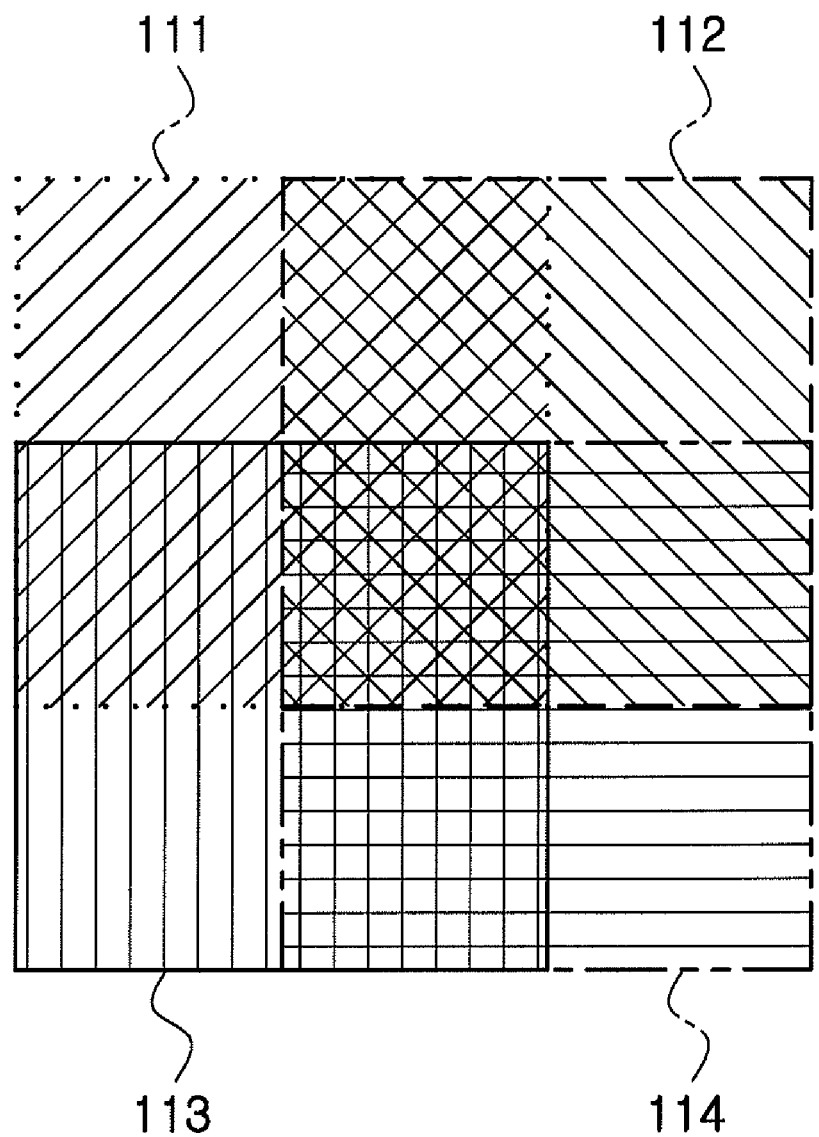
FIG. 2 is a diagram illustrating an overlapped blocking operation in an input image blocking block of the apparatus for removing noise as shown in FIG. 1.

FIG. 2 shows blocks formed by the input image blocking block 100. Referring to FIG. 2, a plurality of blocks 111, 112, 113 and 114 are formed so that they can be overlapped with each other. In this embodiment, adjacent blocks are formed so that half block areas of the entire adjacent blocks can be overlapped with each other.

That is to say, one block 111 and its adjacent block 112 is formed so that a half area of the one block 111 can be overlapped with a half area of the adjacent block 112. Also, an adjacent block 113 is also formed so that a half area of the adjacent block 113 can be overlapped with a half area of the one block 111 in a transverse direction toward the one block 111.

Figure 3:
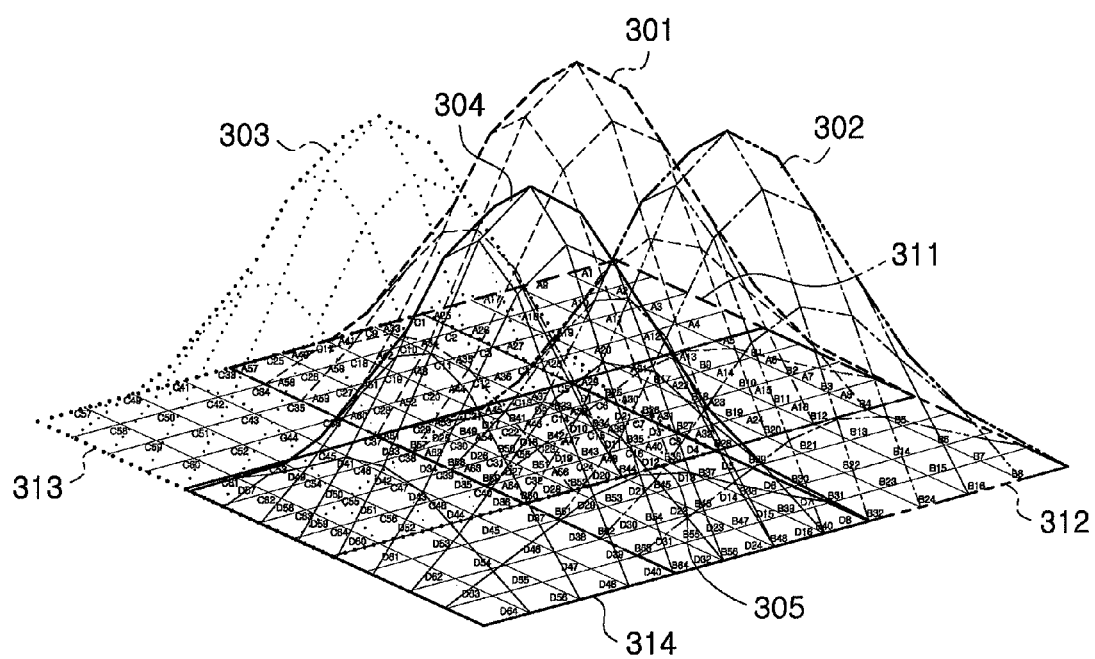
FIG. 3 is a diagram illustrating a mathematical operation in which a block pixel data is recovered in a recovery block of the apparatus for removing noise as shown in FIG. 1.

FIG. 3 is a conceptual diagram illustrating a mathematical operation in which overlapped blocks are recovered in a recovery block 300 as shown in FIG. 1.

Referring to FIG. 3, four blocks 311, 312, 313 and 314 are formed so that their adjacent blocks can be overlapped with each other, and the overlapped areas correspond to half areas of the four blocks, respectively. Therefore, the four blocks are overlapped with each other within some area 205 of each of the blocks in this exemplary embodiment.

When pixel data values in an area in which the adjacent blocks are not overlapped with each other and an area in which the adjacent blocks are overlapped with each other are recovered using the same weight, noises may be generated in interfaces between blocks since the pixel data values are different in the overlapped areas compared to the pixel data values before the overlapped areas are blocked.

Therefore, it is possible to remove a discontinuity noise in the interfaces between the blocks in the recovery of the blocked data by applying different weight to an area in which the adjacent blocks are overlapped with each other. In this exemplary embodiment, pixel data is blocked so that a block half of the pixel data can be overlapped with a half of another pixel data, the weight may be determined according to the distance from the center of each of the blocks.

In this exemplary embodiment of the present invention, the recovered operation values for the pixel data values in each of the blocks 311, 312, 313 and 314 show isotropic distributions 301, 302, 303 and 304. These isotropic distributions may be obtained using a Hanning window. The weight for the overlapped areas may be widely varied according to the overlapped areas between the blocks.

Figure 4:
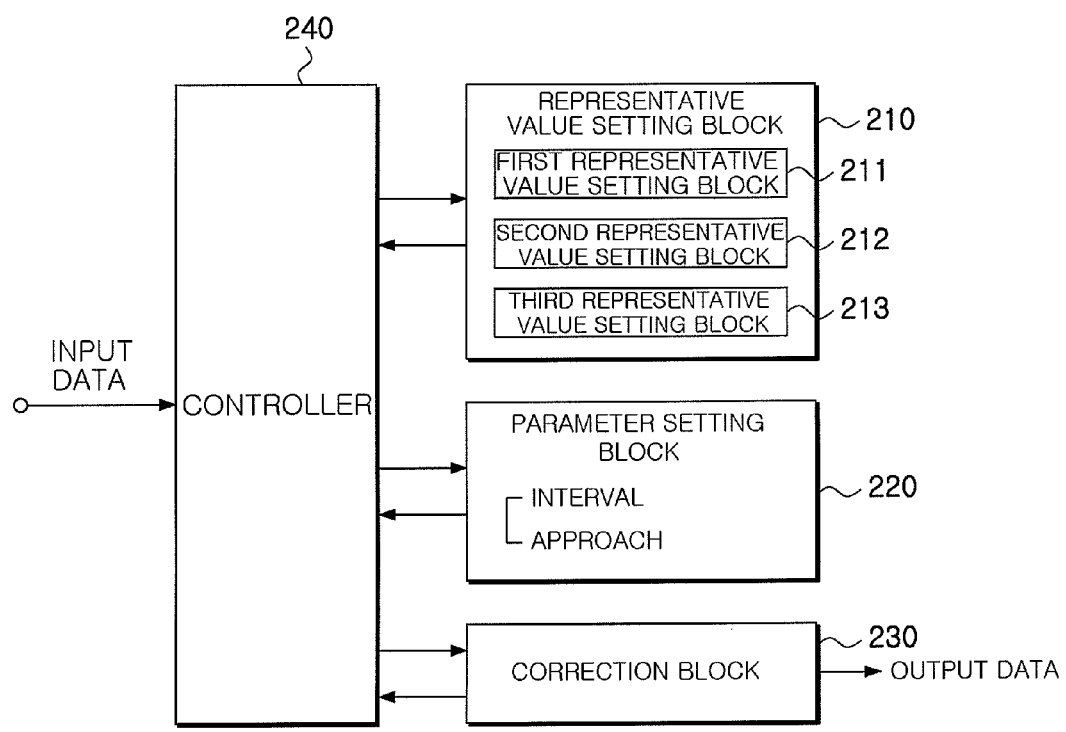
FIG. 4 is a block view illustrating a ringing noise removing block of the apparatus for removing noise as shown in FIG. 1.

FIG. 4 is a block view illustrating a configuration of a system for removing ringing noise in the apparatus for removing noise according to one exemplary embodiment of the present invention.

Referring to FIG. 4, in the apparatus for removing noise according to one exemplary embodiment of the present invention, the system for removing ringing noise includes a representative value setting block 210, a parameter setting block 220, a correction block 230, and a controller 240.

The controller 240 has its own separate memory, and is coupled to the blocks 210, 220 and 230 in a pipeline mode. Therefore, the controller 240 may have a rapid processing rate since its parallel processing operation is possible. In FIG. 4, it is shown that the representative value setting block 210 is coupled to the controller 240, but the representative value setting block 210 may also be coupled in parallel to the first to third representative value setting blocks 211, 212 and 213 in the representative value setting block 210.

The representative value setting block 210 includes a first representative value setting block 211, a second representative value setting block 212, and a third representative value setting block 213.

The representative value setting block 210 may divide pixel data in one block into two groups through a modified K-means algorithm, and set a representative value in each of the groups The parameter setting block 220 calculates intervals and approaches on the basis of the representative value (a third representative value) obtained in the representative value setting block 210.

The intervals are distances between inputted pixel data and the representative value of the group to which the inputted pixel data belong, and the approaches are ratios of distances between inputted pixel data and the representative value of the group to which the inputted pixel data belong to distances between the inputted pixel data and the representative value of the group to which the inputted pixel data do not belong.

The intervals may be calculated as represented by the following Equation 1.

$$\text{Interval} = |R_i - R_{rep\_i}| + |G_i - G_{rep\_i}| + |B_i - B_{rep\_i}| \qquad \text{Equation 1}$$

wherein, $R_i$, $G_i$ and $B_i$ are inputted pixel data, and $R_{rep\_i}$, $G_{rep\_i}$ and $B_{rep\_i}$ are representative value, such as the inputted pixel data, belonging to the group.

The approaches may be calculated as represented by the following Equation 2.

$$\text{Approach} = [(R_i - R_{rep\_a})^2 + (G_i - G_{rep\_a})^2 + (B_i - B_{rep\_a})^2] / [(R_i - R_{rep\_b})^2 + (G_i - G_{rep\_b})^2 + (B_i - B_{rep\_b})^2] \qquad \text{Equation 2}$$

wherein, $R_i$, $G_i$ and $B_i$ are inputted pixel data, $R_{rep\_a}$, $G_{rep\_a}$ and $B_{rep\_a}$ are representative values, such as the inputted pixel data, belonging to the group, and $R_{rep\_b}$, $G_{rep\_b}$ and $B_{rep\_b}$ are representative values belonging to the other group that is different from the group to which the inputted pixel data belong.

The correction block 230 functions to correct the inputted pixel data values using the intervals and approaches.

The correction block 230 may calculate a corrected value using the following Equation 3.

$$R_{i\_mod} = R_i + k \times [(1 - \text{Approach})/(\text{Acc}_{interval})] \times (R_{rep\_i} - R_i)$$

$$G_{i\_mod} = G_i + k \times [(1 - \text{Approach})/(\text{Acc}_{interval})] \times (G_{rep\_i} - G_i)$$

$$B_{i\_mod} = B_i + k \times [(1 - \text{Approach})/(\text{Acc}_{interval})] \times (B_{rep\_i} - B_i) \qquad \text{Equation 3}$$

wherein, k is a constant, $R_i$, $G_i$ and $B_i$ are inputted pixel data, $R_{rep\_i}$, $G_{rep\_i}$ and $B_{rep\_i}$ are representative values, such as the inputted pixel data, belonging to the group, $\text{Acc}_{interval}$ is a value obtained by accumulating intervals by one block, and $R_{i\_mod}$, $G_{i\_mod}$ and $B_{i\_mod}$ represents corrected inputted pixel data values.

Figure 5:
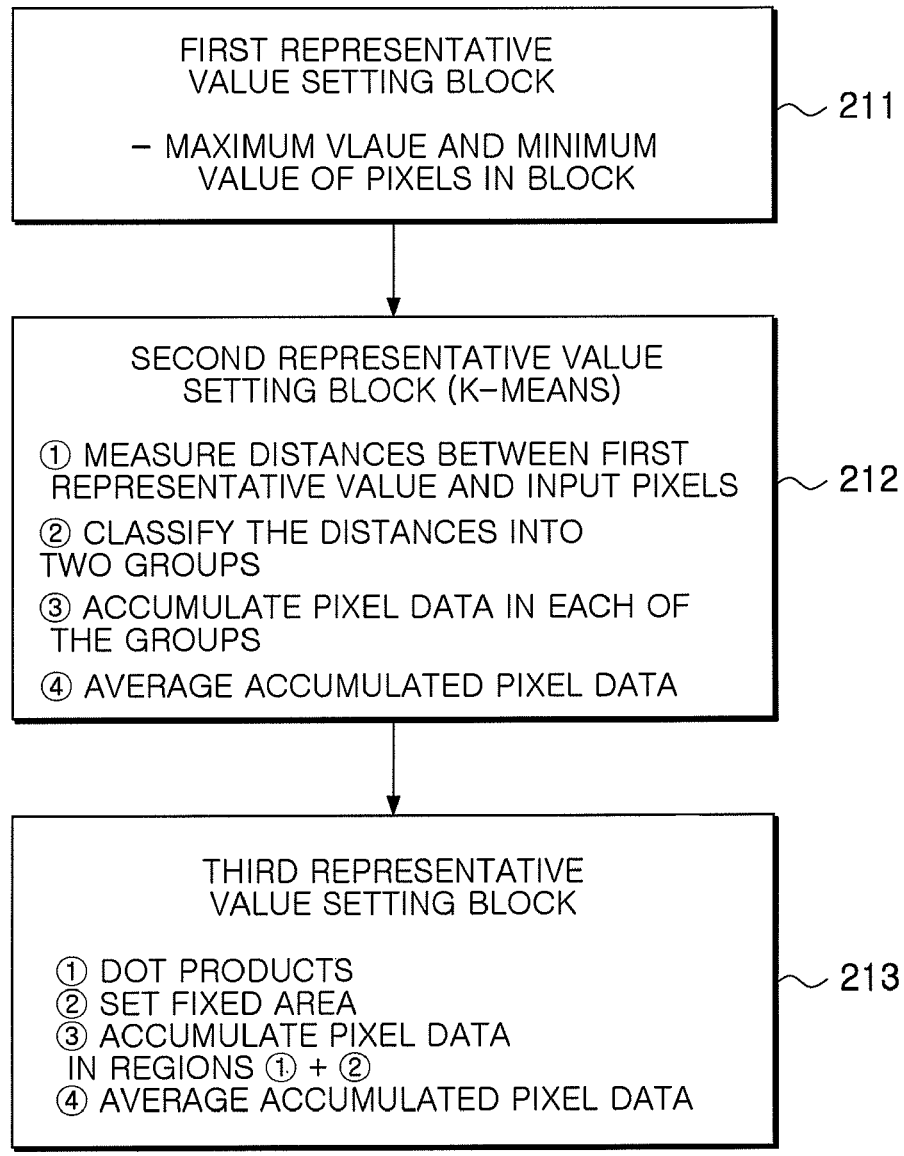
FIG. 5 is a block view illustrating the order of setting a representative value in a representative value setting block of the ringing noise removing block as shown in FIG. 4.

FIG. 5 is a block view illustrating the order of setting a representative value in a representative value setting block as shown in FIG. 4.

Referring to FIG. 5, the representative value setting block according to one exemplary embodiment of the present invention includes a first representative value setting block 211, a second representative value setting block 212, and a third representative value setting block 213.

The first representative value setting block 211 sets a maximum contrast value and a minimum contrast value of the pixels in the block.

In the operation of setting the maximum contrast value and the minimum contrast value, RGB values of the inputted pixel data are first converted into luminance signals, and the luminance signals of the input pixels may be compared to each other to determine the maximum contrast value and the minimum contrast value. Here, the determined maximum value and minimum value become reference values of the K-means algorithm for obtaining second representative values.

The luminance signals for the RGB values of the inputted pixel data may be calculated as represented by the following Equation 4.

$$\text{lum} = (R_{in1} \times 2 + G_{in1} \times 4 + B_{in1})/4 \qquad \text{Equation 4}$$

wherein, lum is a luminance signal, and $R_{in1}$, $G_{in1}$ and $B_{in1}$ are RGB values of the inputted pixel data. The following Equations 5 and 6 may be used to determine the maximum contrast value and the minimum contrast value using the lum value calculated from the Equation 4.

if (lum>maxlum)

$R_{rep1\_1} = R_{in1}$; $G_{rep1\_1} = G_{in1}$; $B_{rep1\_1} = B_{in1}$;
 maxlum=lum;

else "idle" $\qquad$ Equation 5 if (lum<minlum)

$R_{rep1\_2} = R_{in1}$; $G_{rep1\_2} = G_{in1}$; $B_{rep1\_2} = B_{in1}$;
 minlum=lum;

else "idle" $\qquad$ Equation 6

In the Equation 5 and 6, $R_{in1}$, $G_{in1}$ and $B_{in1}$ represent RGB values of the inputted pixel data, and $R_{rep1\_1}$, $G_{rep1\_1}$ and $B_{rep1\_1}$ represent one RGB value out of the first representative values, respectively. And0, $R_{rep1\_2}$, $G_{rep1\_2}$ and $B_{rep1\_2}$ represent the other one RGB value out of the first representative values.

The term "idle" means that there is no operation since there is no condition to be satisfied.

The maximum contrast value and the minimum contrast value in the pixel data in the block may be calculated as represented by Equations 5 and 6.

The second representative value setting block 212 sets a second representative value through a modified K-means algorithm using the first representative value as the reference value.

The principle of the K-means algorithm is to calculate distances between any one point and inputted data and divide the inputted data into several groups by comparing the distances between the one point and the inputted data.

The modified K-means algorithm as used herein uses the first representative value as the reference value and undergoes one arithmetic operation.

First, distances between a pair of the first representative values and the inputted pixel data are calculated, the first representative values being determined in the first representative value setting block.

The distances may be calculated as represented by the following Equations 7 and 8.

$$dist2\_1 = (R_{rep1\_1} - R_{in2})^2 + (G_{rep1\_1} - G_{in2})^2 + (B_{rep1\_1} - B_{in2})^2 \quad \text{Equation 7}$$

$$dist2\_2 = (R_{rep1\_2} - R_{in2})^2 + (G_{rep1\_2} - G_{in2})^2 + (B_{rep1\_2} - B_{in2})^2 \quad \text{Equation 8}$$

In Equation 7, dist2_1 is a distance from the inputted pixel data ($R_{in2}$, $G_{in2}$, $B_{in2}$) to one first representative value ($R_{rep1\_1}$, $G_{rep1\_1}$, $B_{rep1\_1}$) out of a pair of the first representative values, and, in Equation 8, dist2_2 is a distance from the inputted pixel data to the other one first representative value ($R_{rep1\_2}$, $G_{rep1\_2}$, $B_{rep1\_2}$).

The inputted pixel data in the block may be classified into two groups by comparing the distances as calculated thus: an inputted pixel data group (group 1) whose pixel data are closer to one representative value out of a pair of the first representative values and an inputted pixel data group (group 2) whose pixel data are closer to the other one representative value out of a pair of the first representative values.

Next, the inputted pixel data in the two groups are accumulated, respectively.

This operation may be performed as represented by the following Equation 9.

if (dist2_1<=dist2_2)

t1Rp1=t1Rp1+$R_{in2}$; t1Gp1=t1Gp1+$G_{in2}$; t1Bp1=t1Bp1+$B_{in2}$;

labels2=0; nentry1colors1=nentry1colors1+1;

else t1Rp2=t1Rp2+$R_{in2}$; t1Gp2=t1Gp2+$G_{in2}$; t1Bp2=t1Bp2+$B_{in2}$;

labels2=1; nentry1colors2=nentry1colors2+1; Equation 9 wherein, t1Rp1, t1Gp1 and t1Bp1 represent accumulated RGB values of each of the pixels belonging to the group 1, and nentry1colors1 represents the number of the pixels to which the group 1 belongs. Also, t1Rp2, t1Gp2 and t1Bp2 represent accumulated RGB values of each of the pixels to which the group 2 belongs, and nentry1colors2 represents the number of the pixels belonging to the group 2.

A mean value may be obtained by dividing the accumulated value, as obtained thus, in each of the groups by the number of the pixels belonging to the group. Second representative values are obtained through this averaging operation.

The averaging operation may be performed as represented by the following Equations 10 and 11.

$$R_{rep2\_1} = t1Rp1/N_{11}; \; G_{rep2\_1} = t1Gp1/N_{11}; \; B_{rep2\_1} = t1Bp1/N_{11}; \quad \text{Equation 10}$$

$N_{11}$=nentry1colors1

$$R_{rep2\_2} = t1Rp2/N_{12}; \; G_{rep2\_2} = t1Gp2/N_{12}; \; B_{rep2\_2} = t1Bp2/N_{12}; \quad \text{Equation 11}$$

$N_{12}$=nentry1colors2

The second representative values ($R_{rep2\_1}$, $G_{rep2\_1}$, $B_{rep2\_1}$, $R_{rep2\_2}$, $G_{rep2\_2}$, $B_{rep2\_2}$) may be obtained through the Equations 10 and 11.

The third representative value setting block 213 may extract the third representative values using dot products of vectors between the second representative values and the pixel data in the block and an area determination method.

Figure 6:
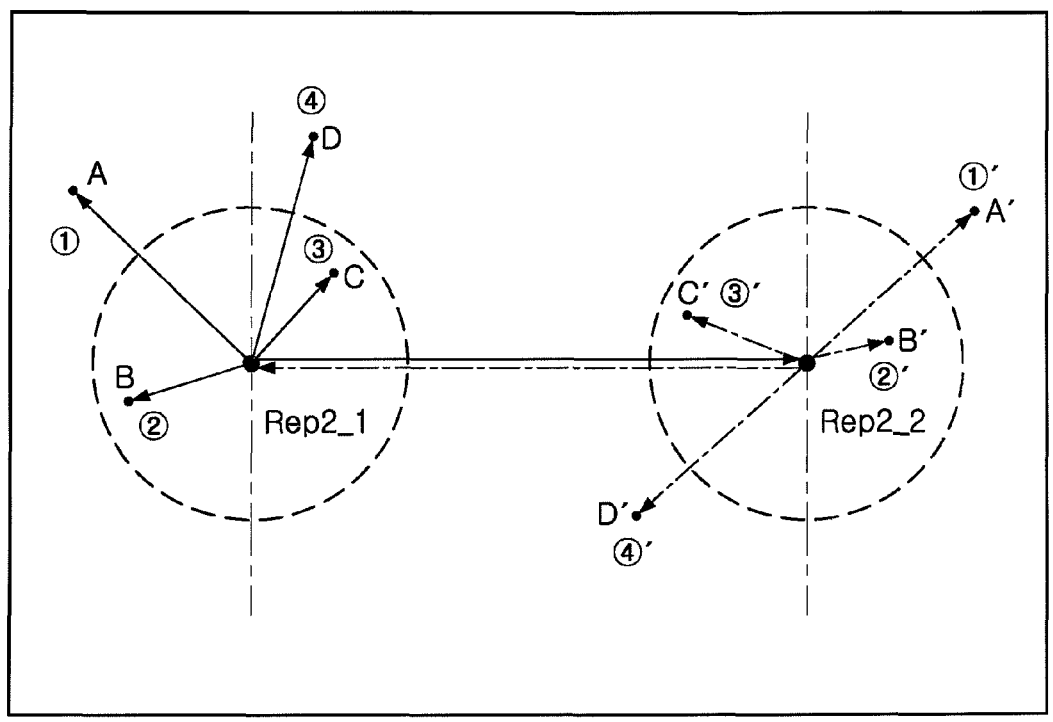
FIG. 6 is a diagram illustrating an operation of setting a third representative value in a third representative value setting block of the representative value setting block as shown in FIG. 5.

FIG. 6 is a conceptual diagram illustrating a dot product and an area determination method that are used to set a third representative value.

First, dot products are obtained using the second representative values (Rep2_1, Rep2_2) and input pixels (A, B, C, D, A', B', C', D'). That is to say, a dot product of a vector to the other one representative value (Rep2_2) is calculated from one representative value (Rep2_1) out of the second representative values, and a dot product of a vector to the inputted pixel data (A, B, C, D) is calculated from the one representative value (Rep2_1). Also, a dot product of a vector to the other one representative value (Rep2_1) is calculated from one representative value (Rep2_2) out of the second representative values, and a dot product of a vector to the inputted pixel data (A', B', C', D') is calculated from the one representative value (Rep2_2).

A distance between the representative values may be enlarged by selecting only the inputted pixel data in which the result obtained by the dot product has a value less than 0. The inputted pixel data in which the dot product value having a value less than 0 are inputted pixel data distributed in regions □ and □ when the representative value Rep2_1 is used as the reference value, and are inputted pixel data distributed in regions □' and □' when the representative value Rep2_2 is used as the reference value.

The area determination method is performed by setting a fixed area based on the second representative values (Rep2_1, Rep2_2) and selecting inputted pixel data in the set area. In this exemplary embodiment, an area corresponding ¼ of a distance between the second representative values (Rep2_1, Rep2_2) is set to a limited area.

In this exemplary embodiment, inputted pixel data in regions □ and □ are selected when the Rep2_1 is used as the reference value, and inputted pixel data in regions □' and □' are selected when Rep2_2 is used as the reference value.

Third representative values may be determined by accumulating data values of input pixels in the area that is determined by the dot product and the area determination method, and averaging the accumulated data values of the input pixels.

The averaging operation may be performed as represented by the following Equations 12 and 13.

First, distances between the second representative values and inputted pixel RGB values are calculated.

$$dist3\_1 = (R_{in3} - R_{rep2\_1})^2 + (G_{in3} - G_{rep2\_1})^2 + (B_{in3} - B_{rep2\_1})^2 \quad \text{Equation 12}$$

$$dist3\_2 = (R_{in3} - R_{rep2\_2})^2 + (G_{in3} - G_{rep2\_2})^2 + (B_{in3} - B_{rep2\_2})^2 \quad \text{Equation 13}$$

wherein, $R_{in3}$, $G_{in3}$ and $B_{in3}$ represent RGB values of the input pixel, and dist3_1 and dist3_2 represent distances from the inputted pixel data to the second representative values, respectively.

The following Equations 14 and 15 are used to obtain dot products between the second representative values and the input pixels.

$$\begin{aligned} dotproduction3\_1 &= \overrightarrow{(RGB_{in3} - rep2\_1)} \cdot \overrightarrow{(rep2\_2 - rep2\_1)} \\ &= (R_{in3} - R_{rep2\_1}) \times (R_{rep2\_2} - R_{rep2\_1}) + \\ &\quad (G_{in3} - G_{rep2\_1}) \times (G_{rep2\_2} - G_{rep2\_1}) + \\ &\quad (B_{in3} - B_{rep2\_1}) \times (B_{rep2\_2} - B_{rep2\_1}) \end{aligned} \quad \text{Equation 14}$$

$$\begin{aligned} dotproduction3\_2 &= \overrightarrow{(RGB_{in3} - rep2\_2)} \cdot \overrightarrow{(rep2\_1 - rep2\_2)} \\ &= (R_{in3} - R_{rep2\_2}) \times (R_{rep2\_1} - R_{rep2\_2}) + \\ &\quad (G_{in3} - G_{rep2\_2}) \times (G_{rep2\_1} - G_{rep2\_2}) + \\ &\quad (B_{in3} - B_{rep2\_2}) \times (B_{rep2\_1} - B_{rep2\_2}) \end{aligned} \quad \text{Equation 15}$$

wherein, dotproduct3_1 represents a value obtained by calculating dot products of a vector from one second representative value (rep2_1) to the other one second representative value (rep2_2), and a vector from the one second representative value (rep2_1) to an inputted pixel data ($RGB_{in3}$).

Also, dotproduct3_2 represents a value obtained by calculating dot products of a vector from one second representative value (rep2_2) to the other one second representative value (rep2_1), and a vector from the one second representative value (rep2_2) to an inputted pixel data ($RGB_{in3}$).

The following Equation 16 is used to calculate a limit distance (limitdist) that is used to set a limited area based on the second representative values. A scare value (paldistance) of a distance between the second representative values is multiplied by 1/16. In this exemplary embodiment, the scare value of the distance between the second representative values is multiplied by 1/16 since a circle having a radius that corresponds to 1/4 of a distance between the second representative values is set to a limited area.

$$limitdist = paldistance/16$$

$$= [(R_{rep2\_2} - R_{rep2\_1})^2 + (G_{rep2\_2} - G_{rep2\_1})^2 + (B_{rep2\_2} - B_{rep2\_1})^2]/16$$

Equation 16

The following Equations 17 and 18 may be used to add pixel data selected by the dot product and the determination method as described above.

if ((dist3_1<=limitdist)□(dotproduct3_1<=0))

$t2Rp1=t2Rp1+R_{in3}$; $t2Gp1=t2Gp1+G_{in3}$; $t2Bp1=t2Bp1+B_{in3}$;

nentry2colors1=nentry2colors1+1;

else "idle"  Equation 17 if ((dist3_2<=limitdist)□(dotproduct3_2<=0))

$t2Rp2=t2Rp2+R_{in3}$; $t2Gp2=t2Gp2+G_{in3}$; $t2Bp2=t2Bp2+B_{in3}$;

nentry2colors2=nentry2colors2+1;

else "idle"  Equation 18 wherein, t2Rp1, t2Gp1 and t2Bp1 represent accumulated RBG values of the pixels (group 1) included in the dot product and the set area on the basis of the one second representative value (rep2_1), and nentry2colors1 represents the number of the pixels belonging to the group 1.

Also, t2Rp2, t2Gp2, t2Bp2 accumulated RBG values of the pixels (group 2) included in the dot product and the set area on the basis of the other one second representative value (rep2_2), and nentry2colors2 represents the number of the pixels belonging to the group 2.

The term "idle" means that there is no operation since there is no condition to be satisfied.

The third representative values are obtained through an averaging operation of dividing the accumulated value by the number of the inputted pixel data.

$R_{rep3\_1}=t2Rp1/N_{21}$; $G_{rep3\_1}=t2Gp1/N_{21}$; $B_{rep3\_1}=t2Bp1/N_{21}$;  Equation 19

$N_{21}$=nentry2colors1

$R_{rep3\_2}=t2Rp2/N_{22}$; $G_{rep3\_2}=t2Gp2/N_{22}$; $B_{rep3\_2}=t2Bp2/N_{22}$;  Equation 20

$N_{22}$=nentry2colors2

The calculated third representative value ($RGB_{rep3\_1}$, $RGB_{rep3\_2}$) as described above becomes a representative value that is used in the parameter generator block 220 and the correction block 230 as shown in FIG. 4.

The apparatus according the present invention may be useful to improve the quality of digital images by removing blocking discontinuity noises and ringing noises.

While the present invention has been shown and described in connection with the exemplary embodiments, it will be apparent to those skilled in the art that modifications and variations can be made without departing from the spirit and scope of the invention as defined by the appended claims.

What is claimed is:

1. An apparatus for removing ringing noise, comprising:
a representative value setting block dividing pixel data in one block including a plurality of pixel data into two groups through a modified K-means algorithm and setting a representative value in each of the groups;
a parameter generator block calculating intervals and approaches between all the pixel data in the block and a pair of the representative values; and
a correction block correcting an inputted pixel data value using the intervals and the approaches,
wherein the intervals are distances between inputted pixel data and the representative value of the group to which the inputted pixel data belong,
wherein the approaches are ratios of distances between inputted pixel data and the representative value of the group to which the inputted pixel data belong to distances between the inputted pixel data and the representative value of the group to which the inputted pixel data do not belong, and
wherein the correction block performs a mathematical operation as represented by the following equations:

$$R_{i\_mod}=R_i+k\times[(1-Approach)/(Acc_{interval})]\times(R_{rep\_i}-R_i)$$

$$G_{i\_mod}=G_i+k\times[(1-Approach)/(Acc_{interval})]\times(G_{rep\_i}-G_i)$$

$$B_{i\_mod}=B_i+k\times[(1-Approach)/(Acc_{interval})]\times(B_{rep\_i}-B_i)$$

wherein, $R_i$, $G_i$ and $B_i$ are inputted pixel data,
$R_{rep\_i}$, $G_{rep\_i}$ and $B_{rep\_i}$ are third representative values, such as the inputted pixel data, belonging to the group,
$Acc_{interval}$ is a value obtained by accumulating intervals by block, and
$R_{i\_mod}$, $G_{i\_mod}$ and $B_{i\_mod}$ are corrected inputted pixel data values.

2. The apparatus of claim 1, wherein an equation used to calculate the intervals is:

$$Interval=|R_i-R_{rep\_i}|+|G_i-G_{rep\_i}|+|B_i-B_{rep\_i}|,$$

wherein, $R_i$, $G_i$ and $B_i$ are inputted pixel data, and
$R_{rep\_i}$, $G_{rep\_i}$ and $B_{rep\_i}$ are representative values, such as the inputted pixel data, belonging to the group.

3. The apparatus of claim 1, wherein an equation used to calculate the approaches is:

$$Approach=[(R_i-R_{rep\_a})^2+(G_i-G_{rep\_a})^2+(B_i-B_{rep\_a})^2]/[(R_i-R_{rep\_b})^2+(G_i-G_{rep\_b})^2+(B_i-B_{rep\_b})^2],$$

wherein, $R_i$, $G_i$ and $B_i$ are inputted pixel data,
$R_{rep\_a}$, $G_{rep\_a}$ and $B_{rep\_a}$ representative values, such as the inputted pixel data, belonging to the group, and $R_{rep\_b}$, $G_{rep\_b}$ and $B_{rep\_b}$ are representative values belonging to the other group that is different from the group to which the inputted pixel data belong.

4. The apparatus of claim 1, wherein the representative value setting block comprises:
   a first representative value setting block selecting, as a pair of first representative values, a pixel data having the maximum contrast and pixel data having the minimum contrast among the pixels in the block;
   a second representative value setting block dividing pixels in the block into two groups through a K-means algorithm by employing a pair of the first representative values as a reference value and extracting pixel data mean values in the respective groups as a pair of second representative values; and
   a third representative value setting block extracting a pair of the third representative values using a vector inner product between the second representative value and the pixel data in the block and an area determination method for selecting pixel data in a predetermined area.

5. The apparatus of claim 4, wherein the second representative value setting block:
   measures distances between each of a pair of the first representative values and the pixel data in the block,
   classifies the pixel data closer to one representative value of a pair of the first representative values into a first group, and the pixel data closer to the other representative value of a pair of the first representative values into a second group,
   accumulates the pixel data belonging respectively to the two groups, and
   averages the accumulated pixel data values in each of the two groups.

6. The apparatus of claim 4, wherein the third representative value setting block:
   sets a pair of the second representative values to fixed areas so that a pair of the second representative values are not overlapped with each other,
   calculates dot products of a vector from one representative value to the other representative value among a pair of the second representative values, and a vector from the one representative value to an inputted pixel data of an area except for the fixed area,
   accumulates a pixel data of an area that is set on the basis of one representative value out of a pair of the second representative values and a pixel data value of an area in which the dot product in the one representative value is less than 0, and
   averages the accumulated pixel data values in each of the two groups.

7. The apparatus of claim 6, wherein the fixed areas are formed in a round shape on the basis of the second representative value.

8. The apparatus of claim 7, wherein the fixed areas have a radius that is ¼ of a distance between a pair of the second representative values.

9. An apparatus for removing noise, comprising:
   an input image blocking block blocking a plurality of pixel data into fixed unit areas;
   a ringing noise removing block setting at least one representative value in each of the blocks, and removing ringing noise based on information on the pixel data and the representative value in each of the blocks; and
   a recovery block recovering the blocked data into a normal image,
   wherein the ringing noise removing block comprises a representative value setting block dividing pixel data in one block into two groups through a modified K-means algorithm and setting the representative value in each of the groups;
   a parameter generator block calculating intervals and approaches between all the pixel data in the block and a pair of the representative values; and
   a correction block correcting an inputted pixel data value using the intervals and the approaches.

10. The apparatus of claim 9, wherein the blocking block blocks some areas of adjacent blocks so that the some areas are overlapped with each other, and
   wherein the recovery block recovers the blocked pixel data into an output image by applying different weights to the blocked pixel data according to the position of pixels in the block.

11. The apparatus of claim 10, wherein the adjacent blocks are arranged so that half block areas of the adjacent blocks are overlapped with each other.

12. The apparatus of claim 9,
   wherein the intervals are distances between inputted pixel data and the representative value of the group to which the inputted pixel data belong,
   wherein the approaches are ratios of distances between inputted pixel data and the representative value of the group to which the inputted pixel data belong to distances between the inputted pixel data and the representative value of the group to which the inputted pixel data do not belong, and
   wherein the correction block performs a mathematical operation as represented by the following equations:

$$R_{i\_mod}=R_i+k\times[(1-\text{Approach})/(\text{Acc}_{interval})]\times(R_{rep\_i}-R_i)$$

$$G_{i\_mod}=G_i+k\times[(1-\text{Approach})/(\text{Acc}_{interval})]\times(G_{rep\_i}-G_i)$$

$$B_{i\_mod}=B_i+k\times[(1-\text{Approach})/(\text{Acc}_{interval})]\times(B_{rep\_i}-B_i)$$

wherein, $R_i$, $G_i$ and $B_i$ are inputted pixel data,
   $R_{rep\_i}$, $G_{rep\_i}$ and $B_{rep\_i}$ are third representative values, such as the inputted pixel data, belonging to the group,
   $\text{Acc}_{interval}$ is a value obtained by accumulating intervals by block, and
   $R_{i\_mod}$, $G_{i\_mod}$ and $B_{i\_mod}$ are corrected inputted pixel data values.

13. The apparatus of claim 12, wherein an equation used to calculate the intervals is:

$$\text{Interval}=|R_i-R_{rep\_i}|+|G_i-G_{rep\_i}|+|B_i-B_{rep\_i}|,$$

wherein, $R_i$, $G_i$ and $B_i$ are inputted pixel data, and
   $R_{rep\_i}$, $G_{rep\_i}$ and $B_{rep\_i}$ are representative values, such as the inputted pixel data, belonging to the group.

14. The apparatus of claim 12, wherein an equation used to calculate the approaches is:

$$\text{Approach}=[(R_i-R_{rep\_a})^2+(G_i-G_{rep\_a})^2+(B_i-B_{rep\_a})^2]/[(R_i-R_{rep\_b})^2+(G_i-G_{rep\_b})^2+(B_i-B_{rep\_b})^2],$$

wherein, $R_i$, $G_i$ and $B_i$ are inputted pixel data,
   $R_{rep\_a}$, $G_{rep\_a}$ and $B_{rep\_a}$ representative values, such as the inputted pixel data, belonging to the group, and
   $R_{rep\_b}$, $G_{rep\_b}$ and $B_{rep\_}$b are representative values belonging to the other group that is different from the group to which the inputted pixel data belong.

15. The apparatus of claim 12, wherein the representative value setting block comprises:
- a first representative value setting block selecting, as a pair of first representative values, a pixel data having the maximum contrast and pixel data having the minimum contrast among the pixels in the block;
- a second representative value setting block dividing pixels in the block into two groups through a K-means algorithm by employing a pair of the first representative values as a reference value and extracting pixel data mean values in the respective groups as a pair of second representative values; and
- a third representative value setting block extracting a pair of the third representative values using a vector inner product between the second representative value and the pixel data in the block and an area determination method for selecting pixel data in a predetermined area.

16. The apparatus of claim 15, wherein the second representative value setting block:
- measures distances between each of a pair of the first representative values and the pixel data in the block,
- classifies the pixel data closer to one representative value of a pair of the first representative values into a first group, and the pixel data closer to the other representative value of a pair of the first representative values into a second group,
- accumulates the pixel data belonging respectively to the two groups, and
- averages the accumulated pixel data values in each of the two groups.

17. The apparatus of claim 15, wherein the third representative value setting block:
- sets a pair of the second representative values to fixed areas so that a pair of the second representative values are not overlapped with each other,
- calculates dot products of a vector from one representative value to the other representative value among a pair of the second representative values, and a vector from the one representative value to an inputted pixel data of an area except for the fixed area,
- accumulates a pixel data of an area that is set on the basis of one representative value out of a pair of the second representative values and a pixel data value of an area in which the dot product in the one representative value is less than 0, and
- averages the accumulated pixel data values in each of the two groups.

18. The apparatus of claim 17, wherein the fixed areas are formed in a round shape on the basis of the second representative value.

19. The apparatus of claim 18, wherein the fixed areas have a radius that is ¼ of a distance between a pair of the second representative values.

* * * * *